March 19, 1940.  R. H. REITER  2,193,908
PROCESS AND APPARATUS FOR BACTERICIDAL TREATMENT
Filed May 11, 1937  2 Sheets-Sheet 1
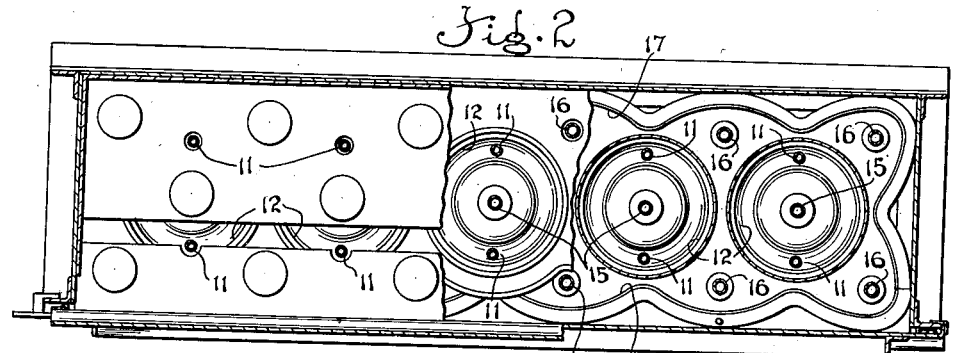
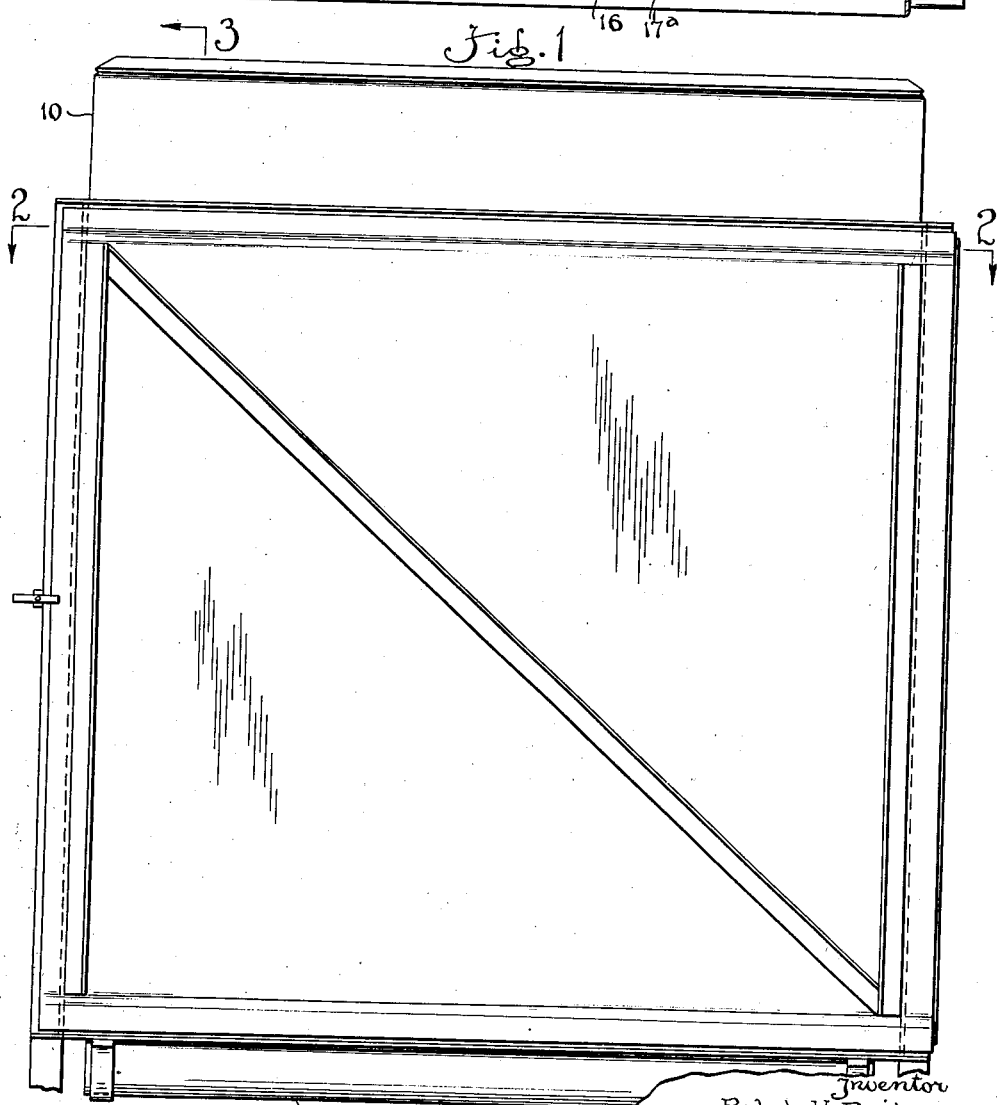
Inventor
Ralph H. Reiter
By Ralph Barrow,
Attorney March 19, 1940.  R. H. REITER  2,193,908
PROCESS AND APPARATUS FOR BACTERICIDAL TREATMENT
Filed May 11, 1937  2 Sheets-Sheet 2
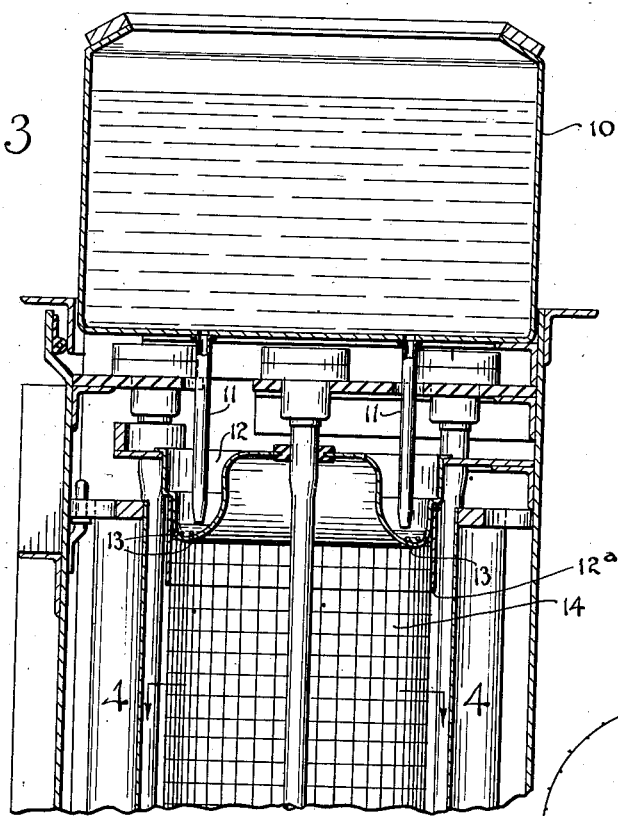
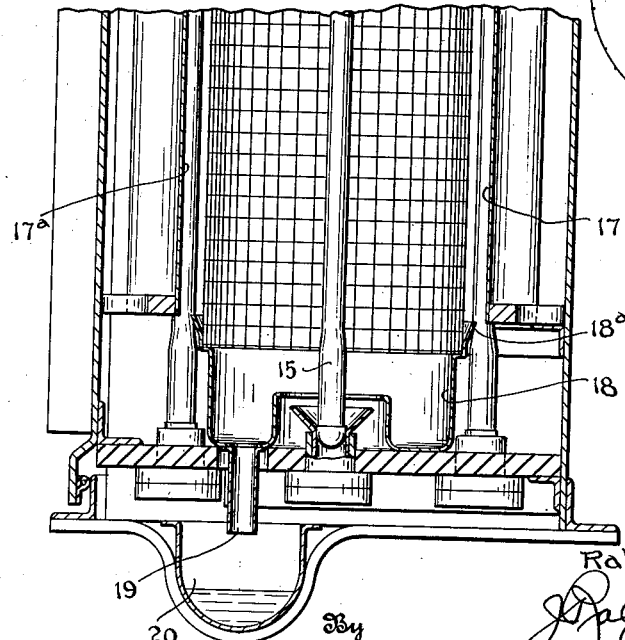
Inventor
Ralph H. Reiter
By
Attorney Patented Mar. 19, 1940

2,193,908

UNITED STATES PATENT OFFICE 2,193,908

PROCESS AND APPARATUS FOR BACTERICIDAL TREATMENT

Ralph H. Reiter, Akron, Ohio

Application May 11, 1937, Serial No. 141,997

2 Claims. (Cl. 250—49)

This invention relates to methods and apparatus for treating liquids, such as milk, which are more or less opaque to bactericidal rays whereby they may be substantially sterilized by such rays without deleterious effect upon the liquid.

The present inventor has found that milk and other liquids may be rendered substantially sterile by bactericidal rays in accordance with known processes and without deleterious reaction upon the milk or other liquid if the milk or other liquid is given a brief treatment to the action of the bactericidal rays in such a condition that the rays can gain access, if only for an instant, to all parts of the milk or other liquid and if the treatment is not prolonged because of inability of the rays to penetrate into a body of the milk or other liquid.

The general purpose of the invention is to provide a method and means for carrying out the same whereby a thin film of the liquid may be subjected to brief, direct action of bactericidal rays preferably simultaneously from both sides of the film, and preferably while so agitating the milk or other liquid in the film as to constantly change the exposed surfaces of the milk to insure that all parts of the liquid are acted upon directly by the rays.

Suitable apparatus embodying and adapted to carry out the invention is illustrated in the accompanying drawings and described below. It is to be understood that the invention is not limited to the specific form thereof shown and described.

Of the accompanying drawings:

Figure 1 is an elevation of apparatus embodying the invention.

Figure 2 is a sectional plan on line 2—2 of Figure 1, parts being broken away.

Figure 3 is an enlarged section, partly broken away, on line 3—3 of Figure 1, and Figure 4 is a section on line 4—4 of Figure 3.

Referring to the drawings, the numeral 10 designates a tank for receiving the milk or other liquid to be treated, from which the liquid may drain slowly out of drain pipes 11, 11 leading therefrom into annular troughs 12. Troughs 12 are provided with small outlet orifices 13, 13 for distributing films of the liquid over the tops of cylindrical screens 14 (see Figures 3 and 4) down which a thin film of milk can flow. Annular members 12a may be provided for firmly and evenly holding the screens 14 about the troughs 12 and for insuring an even distribution of liquid from the orifices 13 to the screens 14.

A suitable bactericidal-ray tube of a known type is arranged on the inside of each screen 14 at 15 and similar tubes are arranged about and between the screens as indicated at 16, 16. Suitable reflectors 17 and 17a are preferably arranged about the outside of the screens 14 and tubes 16 so that all of the rays from tubes 16 will be utilized upon the liquid. The mesh of screens 14 serves to constantly agitate and change the surfaces of the liquid in the film to present all particles of the milk to the action of the rays either at the inside or outside of the screen. The action of the rays is directly upon the liquid from both sides.

At the bottoms of screens 14 are annular drain pans 18 which may have outwardly flaring lips 18a to receive the treated liquid from the screens, and pans 18 have drain outlet pipes 19 thereon from which the treated liquid can flow into a trough 20 by which the liquid can be conducted from the treating apparatus.

The various parts of the apparatus which the milk contacts, including screens 14, may be of stainless steel or other suitable material.

It has been found that by this treatment the bacteria count in milk can be reduced far below present requirements as to pasteurization without deleterious reaction in the milk, providing a milk which will keep longer and supplanting present heat-pasteurizing treatments and thus obviating the expense of heating up and subsequently cooling large volumes of milk.

Modifications of the invention may be resorted to without departing from the spirit thereof or the scope of the appended claims.

What is claimed is:

1. Apparatus of the character described comprising a cylindrical foraminous screen, means inside of the screen for emitting bactericidal rays outwardly of the screen, means outside of the screen for emitting bactericidal rays inwardly toward the screen and all about the same, and means for causing a film of liquid to flow over the surfaces of the screen, said film being so thin as to expose the particles of said liquid to said rays substantially at all times while passing through said zones.

2. Apparatus of the class described comprising a cylindrical foraminous screen, a source of bactericidal rays inside the screen, sources of bactericidal rays arranged about the outside of screen, a reflector for such rays arranged about said last-named sources, whereby said rays are directed against the outside of said screen all about the screen, and means for flowing a film of liquid over the surfaces of the screen, said film being so thin as to expose the particles of said liquid to said rays substantially at all times while passing through said zones.

RALPH H. REITER.